March 22, 1960 L. L. MELLAM 2,929,520
APPARATUS FOR STORING TRAILER BODIES
Filed March 25, 1957
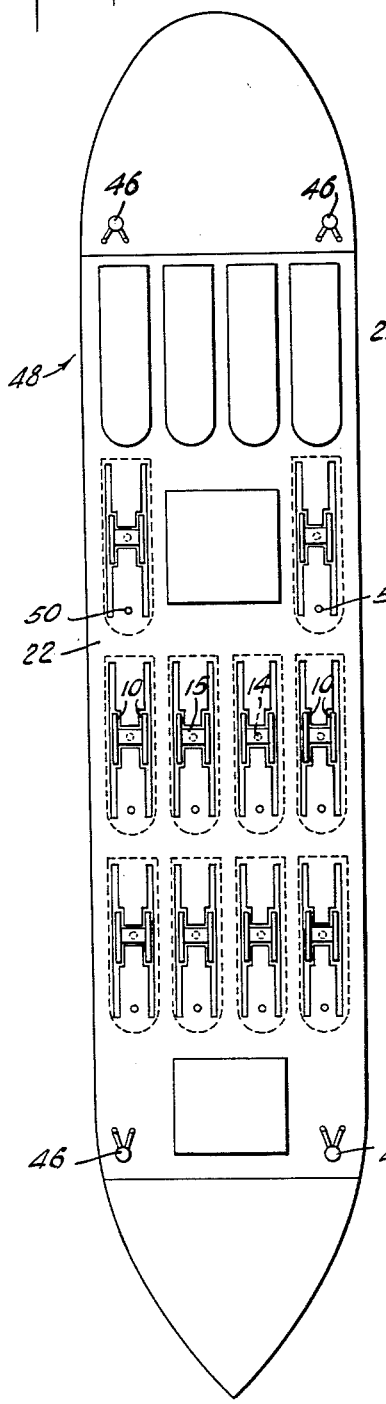
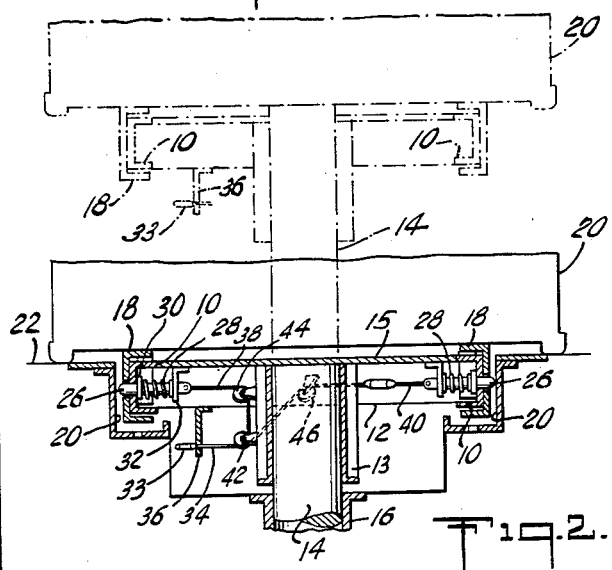
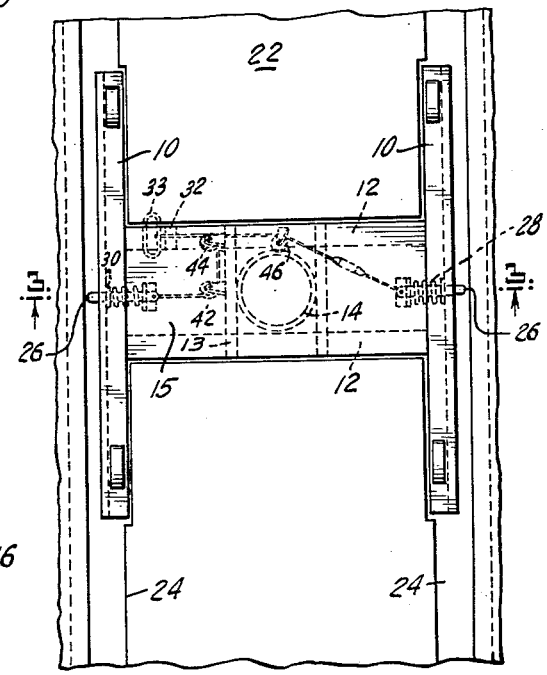
INVENTOR:
Leo L. Mellam
BY
Curtis, Morris & Safford
ATTORNEYS

20

United States Patent Office 2,929,520
Patented Mar. 22, 1960

2,929,520

APPARATUS FOR STORING TRAILER BODIES

Leo L. Mellam, New York, N.Y., assignor to Flexi-Van, Inc., a corporation of Delaware Application March 25, 1957, Serial No. 648,123

2 Claims. (Cl. 214—15)

The present application relates to apparatus for supporting trailer bodies of the type which are adapted for carrying freight either by highway, rail or ship, the apparatus being adapted for use either in a fixed "warehouse" area or on shipboard.

In my co-pending application, Serial No. 637,462 filed January 3, 1957, there is disclosed a trailer body which is adapted to be supported on a pair of removable highway wheels for towing by a truck tractor in customary fashion over the highways, and to be transferred while still loaded with freight to a special railway car for transportation by rail. The trailer body is provided at its bottom with a pair of spaced, longitudinally extending channel members which may form the main structural members of the trailer body. These channels are adapted to slide longitudinally of rail members at the top of the highway wheel assembly, the channels and rail members having a laterally interlocking engagement, and the rail members being provided with latching pins which engage holes in the channels to lock them against relative longitudinal movement when the highway wheels are properly positioned under the trailer body. The railway car is provided with a similar pair of rails which are at the same height above the ground as those on the highway wheel assembly. These rails are mounted on a turntable which may be turned to orient the rails either transversely or longitudinally of the railway car. With the rails extending transversely of the railway car, the trailer body may be backed up at the side of the railway car and, with the latching pin disengaged, the trailer body may be shoved by the tractor longitudinally off the highway wheels and on to the rails on the turntable of the railway car. Similar latching pins are provided on the latter rails to engage holes in the channels when the trailer body reaches the point where its center of gravity is approximately coincident with the axis of the turntable. As the trailer body slides onto the turntable of the railway car, the highway wheels are disengaged and may be rolled away from the railway car. The turntable then may be turned around to align the trailer longitudinally of the railway car, and an automatic latch engages the king pin at the forward end of the bottom of the trailer body to lock the trailer body in such position. The transfer of the trailer body from the railway car to the highway wheel assembly may be accomplished by reversal of these operations. The apparatus is so constructed that either transfer may be made quickly, with very little labor, and without extraneous equipment.

The present invention has for its object the provision of a support for the trailer bodies which may be used for storage of the trailer bodies, for example, in a "staging" area adjacent the rail siding or at dockside. Apparatus of the same general type may likewise be installed in the deck of a ship to store the trailer bodies for marine shipment. The apparatus is so constructed that the transfer from the highway wheel assembly to the support may be made with very little labor and without other equipment. The supporting apparatus is so constructed that it may be lowered flush into the adjacent driving surface or deck, so that a plurality of rows of such devices may be employed to store a large number of the trailer bodies in a closely spaced arrangement, access to the supporting devices in the rear rows being obtained by driving over the empty, retracted supporting devices in the forward rows.

In the drawings:

Figure 1 is a more or less diagrammatic plan view of the top deck of a ship showing a typical arrangement of supporting devices embodying principles of the invention and adapted for the storage of a plurality of trailer bodies on the deck.

Figure 2 is an enlarged fragmentary plan view of the top deck of the ship shown in Figure 1, illustrating one of the supporting devices in retracted position substantially flush with the deck.

Figure 3 is a fragmentary transverse sectional view through one of the supporting devices with a trailer body supported thereon.

As is best shown in Figures 2 and 3, each of the supporting assemblies includes a pair of spaced, parallel rail members 10 which are held in properly spaced, parallel relation by intermediate framing members 12 and 13 which are secured at the upper end of a vertical column 14 which serves as the piston of a cylinder 16 (Figure 3) and forms therewith a conventional hydraulic or pneumatic lift assembly in which hydraulic fluid or air under pressure is supplied into the cylinder 16 to raise the column 14 as and when desired.

As best shown in Figure 3, the rails 10 are spaced apart for laterally interlocking, longitudinally slidable engagement with the channel members 18 which extend parallel to each other along the bottom of the trailer body 20. The deck 22 of the ship is provided with spaced, parallel recesses 24 to receive the rails 10 of the supporting assembly as well as the channels 18 at the bottom of the trailer body 20 when the column 14 is in its lower position, in which it is shown in Figure 3.

By supplying hydraulic fluid or air under pressure to the cylinder 16, the column 14 and the rails 10 thereon may be raised to the height shown in broken lines in Figure 3, at which the rails 10 are at the same height above the deck 22 as the corresponding rails of a highway wheel assembly, such as a highway wheel assembly of the type shown in the co-pending aforementioned application Serial No. 637,462, when the highway wheel assembly is resting on the deck. This permits the trailer body 20 to be pushed from the highway wheel assembly onto the rails 10 or vice versa. To hold the trailer body in proper longitudinal position on the rails 10, a pair of latch pins 26 are provided. These pins 26 extend through openings in the vertical webs of the rails 10 and are urged outwardly by coil springs 28 which are compressed between collars 30 fixed on the pins 26 and flanges 32 which extend downwardly from the upper plate 15. Outward movement of the latch pins 26 is limited by engagement of the collars 30 with the inner faces of the vertical webs of the rails 10.

When the trailer body 20 is pushed lengthwise onto the rails 10, flared portions of the vertical webs of the channels 18 at the rear end of the trailer body engage the outer ends of the latch pins 26 and press them inwardly against the resistance of the springs 28. As the trailer body slides rearwardly along the rails 10, the latch pins 26 ride along the inner faces of the channels 18 until the trailer body 20 is in proper longitudinal position on the rails 10, with the center of gravity of the trailer body approximately coincident with the axis of the column 14. At this point, the latch pins 26 come opposite holes in the vertical webs of the channels 18 and the springs 28 move the latch pins 26 outwardly into interlocking relation with the channels 18, as shown in Figure 3.

To release the latch pins 26, a release handle 33 is provided. This handle is connected to each of the two latch pins 26 by means of a cable harness having a common portion 34 which is secured to the handle 33 and which passes through a bracket 36 secured to one of the transverse framing members 12. This common cable portion 34 has two branches 38 and 40 secured thereto, the branch 38 being trained over pulleys 42 and 44 and being attached to the inner end of one of the two latch pins 26 while the other branch 40 is trained over the pulleys 42 and 45 and is secured to the inner end of the other latch pin 26. Pulling of the handle 33 retracts both of the latch pins 26 against the resistance of the springs 28 and disengages them from the channels 18 of the trailer body 20. When the column 14 is in its upper position, as shown in broken lines in Figure 3, the release handle 33 is exposed so that it may be conveniently grasped and pulled to unlock the trailer body 20 for longitudinal sliding movement off the rails 10 and onto a wheel assembly.

To illustrate the operation of the system, assume that a trailer body 20 has been towed to the dock by a highway truck tractor. The trailer body may be loaded onto the ship either by driving it on over a ramp, or by the use of a crane, such as one of the cranes 46 on the ship. In the latter case, the latch on the fifth wheel of the truck tractor is disengaged from the king pin on the forward end of the trailer body, and the trailer body with the highway wheel assembly thereon is lifted by the crane from the dockside and onto the deck of the ship, where the king pin is engaged by a fifth wheel on a small tractor which is used for the moving of the trailer bodies around the deck of the ship. The tractor is used to back the trailer onto one of the pairs of rails 10 which have been raised to the proper height by the cylinder 16. As the trailer body is backed up to the raised supporting device on which the trailer body is to be loaded, the rear end of the highway wheel assembly engages the forward ends of the rails 10 and as the trailer body 20 is shoved rearwardly onto the rails 10 it is disengaged from the corresponding rails on the wheel assembly. The wheel assembly is then pulled out of the way and may be lowered back to the dock, for example by crane.

Ordinarily, the first trailers to be loaded will be placed on the supporting devices in the rearmost row, as shown at 48 in Figure 1. At this time, the supporting devices in the forward rows are in the retracted position, flush with the deck 22 of the ship, so that the tractors and the wheel assemblies of the trailer bodies being loaded may roll directly over them without obstruction. As soon as the trailer body 20 is in proper position on the rails 10 of the support assembly, the column 14 is then lowered to the point shown in full lines in Figure 3, at which the trailer body rests on the deck 22 of the ship. The king pin which projects downwardly from the forward end of the trailer body 20 is received in a recess 50 (Figure 1) in the deck 22. The trailer body 20 is thus held against rotational movement about the column 14 as well as against translational and tipping movement, and is properly secured for ocean shipment.

The system described has the advantage that the wheel assemblies are left ashore to be used there rather than being carried aboard ship where they perform no useful function in transit. Moreover, the license registration is obtained for the highway wheel assembly rather than for the trailer bodies and no license registrations are wasted on trailer bodies which are not moving over the highways but may be out of the country most of the time.

When it is desired to unload the trailer bodies, the highway wheel assemblies therefor are raised from the dock to the deck of the ship, for example, by crane, and the supporting device on which the trailer body is to be loaded is raised to the level shown in broken lines in Figure 3, at which the rails 10 are at the same height as the corresponding rails of the wheel assembly. Then, with the wheel assembly backed up end-to-end with the rails 10, and with the brakes on the wheel assemblies locked to prevent their moving away from the rails 10, the release handle 33 is pulled to unlock the trailer body and the trailer body is pulled lengthwise off the rails 10 and onto the wheel assembly. When the trailer body is properly positioned on the wheel assembly, the two are automatically locked together by the latch mechanism shown in the aforementioned copending application. Then the trailer body and the attached wheel assembly are moved from the deck of the ship to the dock either by towing them over a ramp or by lifting them with a crane onto the dock where the king pin on the trailer body is engaged by the fifth wheel of a truck tractor.

While in Figure 1 the supporting devices are shown installed in the top deck of a cargo ship, they are equally well adapted for installation on lower decks of the ship. The trailer bodies can be moved to and from the lower decks by lowering and raising them through a hatchway by means of crane, or by towing them over a ramp and through an access door in the side of the ship above the water line. By making the headroom between decks just great enough to provide clearance for the trailer bodies on their wheel assemblies, a high degree of efficiency of space utilization can be achieved. The compartmentation provided by storage of the freight in the trailer bodies limits shifting of the ship's cargo in rough seas and enhances safety.

The slots 24 in the deck 22, which, in the particular embodiment of the invention shown in the drawings, receive the channel frames 18 of the trailer body 20, can be dispensed with if desired. Instead, for example, the slots may be made just large enough to receive the rails 10 and permit the supporting device to be lowered flush with the deck 22 when there is no trailer body on the supporting device. When there is a trailer body on the supporting device, the column 14 will be lowered to the point where the channel frames on the bottom of the trailer body rest on the deck. This will properly support the trailer body for transit. The king pin of the trailer body, which may be above the level of the deck, could be engaged by a latch which is retracted into the deck when not in use. Alternatively, rotational movement of the supporting device and the trailer body stored thereon could be prevented without engagement of the king pin, for example by a key on the column 14, or by the use of two smaller columns in place of the one large column.

As will readily be understood, supporting devices of the type disclosed herein may be installed in a fixed land installation, in which the reference numeral 22, instead of representing the deck of a ship, would represent any relatively level driving surface. If only one row of trailer bodies is to be stored, it is of course not necessary that the support assemblies be retractable. In this case the rails 10 could be permanently supported on a fixed frame at a height above the driving surface equal to that of the corresponding rails of the highway wheel assemblies, as indicated in broken lines in Figure 3. This would eliminate the need for a hydraulic or pneumatic cylinder lift arrangement and make the supporting device very inexpensive. A similar arrangement for storing the trailer bodies at a rail transfer point could likewise be provided.

From the foregoing description, it will be understood that the present invention provides a simple and effective system for transferring trailer bodies quickly from a dock to a ship and vice versa and for storing them either on the dock or on the ship in transit. It will therefore be appreciated that the aforementioned and other desirable objectives have been achieved. However, it should be emphasized that the particular embodiment of the invention which is shown in the accompanying drawings and described hereinabove is intended as merely illustrative of the principles of the invention rather than as exhaustive thereof or as restrictive of the coverage of this patent, which is limited only by the accompanying claims.

I claim:

1. On a marine ship, apparatus for receiving cargo from a wheel assembly and storing the same on a deck of said ship, said apparatus comprising a trailer body having parallel longitudinal framing members extending along its bottom, a pair of parallel rail members spaced to engage the framing members on said trailer body in longitudinally slidable, laterally interlocking relation, a support for said rail members said support being vertically movable between an upper position at which said rail members are at a height above said driving surface substantially equal to the height of said framing members when said trailer body is on said wheel assembly and a lower position at which the upper surfaces of said rail members are substantially flush with said driving surface, recesses in said deck for receiving said rail members at a level where their upper surfaces are generally flush with said deck, a fluid pressure cylinder mounted below said deck and connected to said supporting frame and means to supply fluid under pressure to said cylinder to raise said rail members from said level to a height above said deck substantially equal to that of said framing members when trailer body is supported by said wheel assembly on said driving surface.

2. Apparatus for receiving from wheel assemblies and storing freight, said apparatus comprising a plurality of trailer bodies each having parallel longitudinal framing members extending along its bottom, a driving surface, a plurality of supporting devices each comprising a pair of parallel rail members spaced to engage the framing members of said trailer bodies in longitudinally slidable, laterally interlocking relation, a supporting frame extending between said rail members, said supporting devices being arranged in a plurality of rows extending transversely relative to said rail members, the supporting devices in each row being spaced apart at intervals not substantially greater than the width of the trailer bodies, with the several rows being spaced apart at intervals not substantially greater than the length of the trailer bodies, recesses in said driving surface for receiving the rail members and the supporting frames of the supporting devices in at least all of said rows except the row extending across one end of the group at a lower level at which their upper surfaces are substantially flush with said driving surface, and power means for raising the rail members and supporting frames of the supporting devices receivable in said recesses from said lower level to an upper level at which they are substantially the same height as said framing members when said trailer bodies are supported by said wheel assemblies on said driving surface.

References Cited in the file of this patent

UNITED STATES PATENTS

| 283,218 | De Rycke | Aug. 14, 1883 |
| 1,270,086 | Wochner | June 18, 1918 |
| 2,010,969 | Soulis | Aug. 13, 1935 |
| 2,223,275 | Valenzuela | Nov. 26, 1940 |
| 2,715,971 | Cox | Aug. 23, 1955 |
| 2,767,661 | Tennant | Oct. 23, 1956 |
| 2,808,289 | Scoby | Oct. 1, 1957 |

FOREIGN PATENTS

| 27,270 | Sweden | Sept. 9, 1908 |

OTHER REFERENCES

Rotary Lift Publication, Catalog 121, July 12, 1951.